Oct. 10, 1933.  J. B. HENDERSON  1,930,096
GYROSCOPIC INSTRUMENT AND APPARATUS
Original Filed July 26, 1919
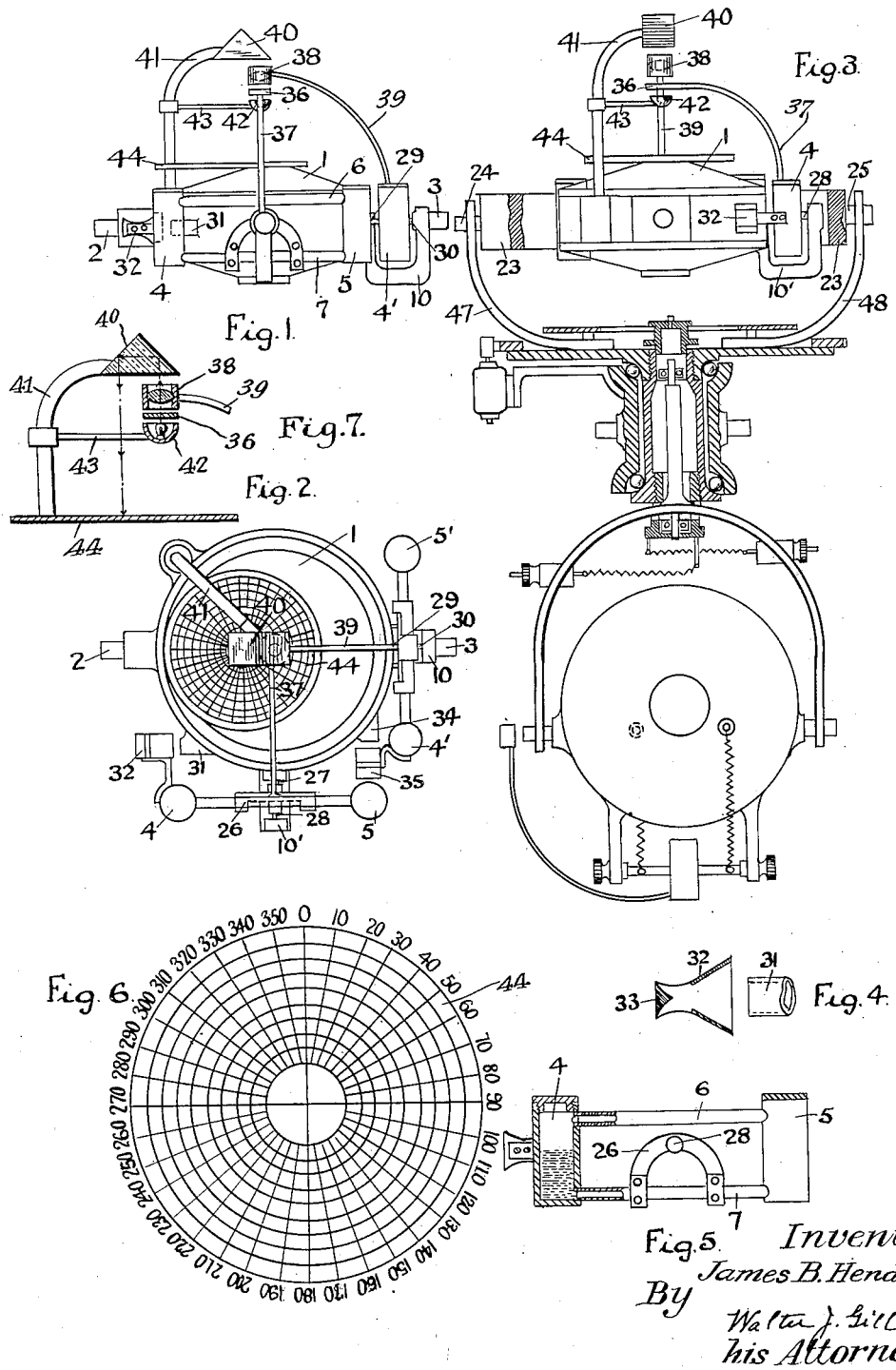
Inventor
James B. Henderson
By Walter J. Gill
his Attorney Patented Oct. 10, 1933

1,930,096

UNITED STATES PATENT OFFICE 1,930,096

GYROSCOPIC INSTRUMENT AND APPARATUS

James Blacklock Henderson, Lee, England

Original application July 26, 1919, Serial No. 313,540. Renewed December 18, 1925, Patent No. 1,644,921, dated October 11, 1927, and in Great Britain July 21, 1917. Divided and this application June 23, 1920. Serial No. 391,187

16 Claims. (Cl. 33—204)

(Granted under the provisions of the act of March 3, 1921, 41 Stat. L., 1313)

Application has been filed in Great Britain, July 21, 1917.

This application is divided out from my copending application No. 313,540, filed July 26, 1919, Patent No. 1,644,921 dated Oct. 11, 1927.

In my copending applications No. 313,537 filed July 26, 1919, and No. 382,676, filed May 19, 1920, which has matured into Patent No. 1,707,475, issued April 2, 1929, I have described a number of methods of controlling a gyroscope, all of which have the common feature that the gyro is normally in neutral equilibrium but when tilted out of its normal position a level forms the primary agent which introduces the controlling forces. When a gyro has come to its steady state relatively to the earth or relatively to the vessel carrying it, it must then partake of the angular motion of the earth, and also of any angular motion round the earth of the vessel on which the gyro is mounted. These angular velocities of precession of the gyro can only be produced by couples brought about by a displacement or displacements of the level or levels controlling the gyroscope, and my present invention consists in indicating or measuring these displacements of the levels relatively to the gyro in a practical manner so that the gyro can be used as a navigational instrument say for use on air-craft or sea-craft for measuring the ground-speed of the craft.

For this purpose I use a gyroscope mounted in neutral equilibrium on gimbals with the gimbal ring horizontal and the rotor axis preferably vertical so that the continuous change of position of the true vertical due to the ground speed will have a maximum effect. The gimbal trunnions are at right angles to each other and preferably maintained N—S and E—W for a reason which will be explained later. I control the gyroscope about each of these trunnion axes by means of levels of the type described in my co-pending application Serial No. 382,676, (now Patent No. 1,707,475) each level comprising two vessels containing fluid and connected by a small-bore tube through which the fluid has to pass from one vessel to the other when the level tilts. The levels are pivoted on the gyro or its gimbal ring coaxially with the gimbal trunnions and are caused to tilt about these axes with the gyroscope by a fluid pressure device which has the important peculiarity that while it applies a torque to the level when the gyro tilts, causing the level to tilt with the gyro, it applies no torque to the gyro in the plane of that tilt. The gyro has therefore no direct gravity control. Furthermore, the flow of fluid in the levels is so restricted by the small-bore tubes that the fluid can only flow slowly from one vessel to the other so that short period accelerations, such as those of rolling, pitching or yawing of the craft, or swinging of the instrument in its binnacle or support, have a negligible immediate effect, while their integral effect, like the integral value of the accelerations themselves, is zero. All such accelerations have therefore at all times a negligible effect on the gyroscope. The instrument is therefore only subject to disturbance from accelerations and velocities whose integral effect is not zero, and such accelerations and velocities can be classified under the three following heads:—

(a) Those due to the earth's rotation, (b) Those due to continuous accelerations of the craft in changing course or speed, and (c) Those due to ground speed.

To measure the effect of ground speed, which is the object of the invention, it is therefore necessary to isolate the third of those classes of phenomena from the other two. Those due to the earth's rotation I eliminate by a method similar to that adopted in the gyro compass to prevent deviation of the compass due to the rate of change of azimuth of the meridian, $\omega \sin \lambda$, wherein $\omega$ is the angular velocity of the earth's rotation and $\lambda$ the latitude, the only difference being that as the rotor axis in my invention is vertical instead of horizontal, the compensating precession which has to be applied is $\omega \cos \lambda$. As the angular movement of the true vertical is always easterly, I apply the compensation by means of a torque, effected by a suitable loading of the gyroscope or one of the levels, acting about an E—W axis of the gyro so as to cause precession in the E—W vertical plane, and as it would be inconvenient to have to shift this loading about as the craft turns, I prefer to mount the loading so as to act always about one of the trunnion axes of the gyroscope, and I then keep the entire instrument oriented by a control from a compass so that this particular trunnion axis is always kept pointing E—W. The gyroscope will then precess steadily eastwards at the rate $\omega \cos \lambda$ and will not give any visible indication of the earth's rotation.

Disturbances under heading (b) I prefer to segregate by letting them die out, because they are of a transitory nature and the circumstances in which measurement of the ground speed is normally required are such that time can be allowed for the temporary effects of such accelerations to die out. This procedure is facilitated by the particular type of level control adopted in my invention. The absence of direct gravity control and the fact that, as will be seen, the torques applied by each level when the gyro tilts cause the rotor axis to precess in the vertical plane of the tilt back towards the vertical, completely eliminate the conical precession to which gravitationally controlled vertical gyroscopes are normally subject. When disturbed by an acceleration, therefore, instead of precessing conically around the vertical for a long period of time, the gyroscope of my invention, as soon as the acceleration has ceased, commences to precess by the straightest path to its new settling position, this precession being aperiodic, that is to say, the deviation between the position of the rotor axis at the end of the acceleration and the new position of steady state will be diminished by equal percentage decrements in equal intervals of time and the percentage can be determined by suitable arrangements of the constants of the gyroscope and its control. The time required to elapse after termination of an acceleration in order to read the new ground speed will therefore depend on the constants of the instrument and on the percentage accuracy required. If, for instance, the instrument is arranged to reduce any deviation to 10% in 10 minutes of time, and a reading to 1% of accuracy were required, it would be necessary to wait for 20 minutes after an acceleration before taking the reading, whereas if 10% accuracy were sufficient, the time required would only be 10 minutes. It has to be remembered that readings of ground speed are unnecessary in conditions of rapid manoeuvre but are of the greatest value on long flights where course and speed are altered at fairly long intervals. In such conditions, therefore, there is no great drawback in having to wait for a short interval to elapse after changing course or speed before taking the new reading. In this respect one advantage of my invention is that if the instrument is disturbed so as to give an unreliable reading, its indication is unsteady so that it is known to be unreliable, but the pilot knows that he has only to hold a steady course and speed for a short interval to allow the instrument to regain a steady state and a steady, reliable reading. It is, therefore, apparent that an intrument which will give a reliable indication of the ground speed under these conditions without reference to external objects and which is equally useful by night and by day, in clear weather or in fog, is a useful adjunct to navigation and aviation.

Fig. 1 is a view in elevation of an instrument embodying the invention. Fig. 2 is a plan view of the instrument. Fig. 3 is an elevation partly in section of the instrument mounted upon a gyro-compass. Fig. 4 is a detail view of one of the air jets and its reaction nozzle, the nozzle being shown in section. Fig. 5 is a detail view partly in section of one of the levels. Fig. 6 is a plan view of the card of the instrument on an enlarged scale, and Fig. 7 is an enlarged detail view partly in section of the optical parts of the instrument.

In Figures 1 to 3 the gyro case 1 is supported on trunnions 2 and 3 in a horizontal gimbal ring 23, shown in section in Fig. 3, the latter being supported on two trunnions 24 and 25, so that the gyro is free to turn its axis in any direction. The trunnion 3 is attached to the gyro case 1 by the U bracket 10. The gyro is in neutral equilibrium on the trunnion axes. The gravity control is introduced by two levels 4—5 and 4'—5' each consisting of two vertical cups 4 and 5 (Fig. 5) connected by tubes 6 and 7 and containing viscous fluid. The level 4—5 is carried by a frame 26 which is pivoted on the two small trunnions 27 and 28 (Fig. 2) on the U bracket 10' attached to the gyro case. The level 4'—5' is similarly pivotally mounted on two trunnions 29 and 30. The two pivotal axes of the levels pass through the centre of suspension of the gyro and when the levels are horizontal each is in neutral equilibrium on its trunnions. Thus the gravity control on the level is only due to the fluid flowing from one side to the other and it is therefore in unstable equilibrium on its trunnions. The level 4—5 is constrained relatively to the gyro by a jet of air issuing from a nozzle 31 on the gyro case, which passes through a chute attached to the vessel 4 of the level. A section of the chute is shown in Fig. 4 which shows that the jet issuing from the nozzle 31 passes through the hopper shaped chute 32 and then divides on the triangular shaped blade 33 which is attached to the hopper. If the chute moves up or down relatively to the nozzle 31 more air is deflected up or down respectively and the force on the chute tends to keep it coaxial with the jet. The resultant reaction on the chute of any unequal division of the air stream acts vertically on the chute and is conveyed to the gyro through the pivots of the level, being equivalent to a vertical pressure, equal to the resultant reaction on the chute, acting on the gyro at the point where the axis of the air nozzle cuts the trunnion axis of the gyro. This point is eccentric on the gyro, so that the torque on the level due to the air-jet is conveyed to the gyro as a torque in the vertical plane of the trunnion axis around which the level is pivoted, so that the resultant precession is in the plane in which the gyro and level have tilted, and the chute is situated at the side of the gyro at which the torque, so applied, will cause the precession to be opposite to this tilt. This couple produced by the air reactions on the chute I call the restoring couple because it restores the gyro to the vertical. If the gyro tilts so that the level 4—5 is inclined to the horizontal, the fluid flows towards one side, say towards 4, and the extra weight in 4 is supported by a vertical force on the chute 32 due to the air jet. The extra weight in 4 produces no direct couple on the gyro but only the restoring couple which is arranged so that it causes the gyro to precess back to the vertical again. The second level is controlled similarly by the jet issuing from nozzle 34 passing through chute 35. If the gyro tilts about an axis lying between its trunnion axes both levels tilt proportionately to the component tilt of the gyro in their respective planes, and each applies a restoring couple to the gyro about the trunnion axis at right angles to its own pivot axis to annul the component tilt in its own plane. Since both of the resulting precessions are rectilinear, the total precession of the gyro is in a straight line towards the vertical, the gyro being thus freed from the conical precession to which gravitationally controlled vertical gyroscopes are subject, and as the precession is necessarily proportional to the torque causing it, while the torque is proportional to the relative tilt between the gyro and level, which in turn is proportional to the tilt of the gyro from the vertical, it follows that the precession of the gyro is proportional to the gyro tilt and is therefore aperiodic, that is to say, a tilt of the rotor axis will be diminished by equal percentage decrements in equal intervals of time. If the vertical is changing its position in space, as it is always doing due to the earth's rotation or to the speed of the craft, the gyro axis never reaches the vertical but always lags behind it by an amount proportional to the angular velocity of the vertical in space, i. e. by ω cosine λ due to the earth's rotation, if ω is the angular velocity of the earth and λ the latitude. The gyro axis therefore always tilts to the west by an amount proportional to the cosine of the latitude, unless additional means are taken for bringing the axis to the vertical, with additional tilts E—W and N—S corresponding to the ground speed of the craft.

I indicate and measure the tilt of the gyro axis preferably by magnifying it by optical means. One convenient method is illustrated in Figs. 1, 2 and 3. A diaphragm 36 having a small hole at the centre is supported by a bracket 37 from the frame 26 carrying the level 4—5 so that the diaphragm moves with the level. A short focus lens in a cell 38 is similarly supported by the bracket 39 from the level 4'—5'. A double reflection prism 40 is rigidly supported on the gyro case 1 by the pillar 41. The diaphragm 36 is illuminated by a small lamp in a shade 42 supported by a bracket 43 from the pillar 41. The lamp is energized by current from the same source which drives the gyro. A card or dial 44 is attached to the gyro case. An image of the diaphragm 36 is formed by the lens 38 on the card 44 and the position of the spot of light on the card and its distance from the centre of the card indicate respectively the direction and the amount of the tilt of the gyro axis.

In the absence of any translational motion of the gyro relatively to the earth the spot of light will always lie to the west of the centre of the card. I keep the gyro case therefore oriented so that the trunnions 2—3 have a constant bearing relatively to the meridian.

In order to compensate for the earth's rotation and to bring the spot of light to the centre of the card when the gyro has no motion relatively to the earth, I place a small weight either on the north end of the gyro case or on the west side of the level. The observations of ground-speed in air-craft would usually be made periodically to determine the speed and direction of the wind relatively to the earth from time to time. If the aeroplane or airship is steered by an independent instrument on a steady course for a few minutes with the weight on the north end say, the spot of light comes to a steady position, the distance from the centre and the bearing of which gives the ground-speed of the air-craft and its direction. Since the speed relatively to the air is known, the speed of the wind is easily deduced from the Dumaresque instrument for combining velocities. When great accuracy or frequent readings are required I mount the ground-speed indicator or meter on a gyro compass as is illustrated in Fig. 7, the type of gyro compass illustrated being one described in my previous application No. 313,537. The trunnions 24 and 25 are shown supported on brackets 47—48 which are rigidly attached to the following element of the compass so that the trunnions 24 and 25 are permanently east and west. I compensate the earth's rotation as described above and I graduate the card 44 either in concentric circles or rectangularly in knots. The circles (Fig. 6) would give the ground-speed and the radial lines its direction whereas the rectangular co-ordinates would give component speeds along and perpendicular to the meridian.

In the arrangement illustrated in Figs. 1, 2 and 3 the levels may be constrained relatively to the gyro by springs as well as by the air jets but the air jet control has the great advantage that the only precession of the gyro is opposite to the tilt of the level and it eliminates the conical precession of the gyro axis which is common in gyroscopes with gravitational stability or instability. If the levels have also spring control in addition to the air control the tilt of each level does not then give the ground speed parallel to the level as it does when there is no spring control. If the ground speed ahead and athwartships is required these can still be obtained by turning the instrument in azimuth relatively to the aeroplane so that the levels make with the fore-and-aft and athwartships lines an angle whose tangent is the ratio of the spring control to the jet control. The deviation of the spot of light in the fore-and-aft direction then measures the ground speed ahead and the deviation athwartships likewise measures the ground-speed athwartships.

It will be noted that if the instrument is not mounted on the gyro compass the weight which compensates the earth's rotation must always be turned by hand into its proper position relatively to the compass. I may alternatively apply this couple by means of a weight fixed to the card of a magnetic compass mounted on the gyro or I may apply it magnetically by attaching magnets to the gyro case. None of these arrangements however can be so satisfactory as the gyro compass arrangement illustrated in Fig. 5.

It is not necessary that the rotor axis of the gyro should be approximately vertical in an instrument controlled by two levels. It may be tilted at small angles by loading the level on the opposite side to the tilt to be produced in which case the level and gyro tilt together but for large tilts it would be necessary to tilt the gyro relatively to the level and alter the shape of the brackets which attach the air chutes to the level so that the chutes would be coaxial with the air jets when the level is horizontal and the gyro is tilted at the required angle. I may tilt the gyro axis so that it is parallel to the earth's axis in which case the rotation of the earth has no effect on it and the deviation of the spot of light is then due to ground speed alone.

Although the gyro is tilted I prefer to keep the optical gear vertical and the card horizontal which is easily done by a small modification of the design in Figs. 1 and 2.

Having now particularly described and ascertained the nature of my said invention and in what manner the same is to be performed, I declare that what I claim is:—

1. A navigational instrument adapted to be mounted upon a craft and comprising a gyroscope, and means associated with the gyroscope for indicating the ground speed of the craft.

2. A navigational instrument adapted to be mounted upon a craft and comprising a gyroscope having a substantially vertical spinning axis and means associated with the gyroscope responsive to the angular velocity of the axis for indicating the ground speed of the craft.

3. A navigational instrument adapted to be mounted upon a craft and comprising a gyroscope mounted in neutral equilibrium, means for imparting gravity control to the gyroscope, and means under the control of said first-named means for indicating the ground speed of the craft.

4. A navigational instrument adapted to be mounted upon a craft and comprising a gyroscope mounted in neutral equilibrium, means for imparting gravity control to the gyroscope, and means controlled jointly by the gyroscope and the first named means for indicating the ground speed of the craft.

5. A navigational instrument adapted to be mounted upon a craft and comprising a gyroscope mounted in neutral equilibrium, a liquid level device for imparting gravity control to the gyroscope, and means under the control of the device for indicating the ground speed of the craft.

6. A navigational instrument adapted to be mounted upon a craft and comprising a suspended gyroscope mounted in neutral equilibrium, a pair of liquid level devices carried by said gyroscope and having liquid containing portions disposed eccentrically of the center of suspension of said gyroscope in relative angular disposition to each other for imparting gravity control to the gyroscope, and means under the control of the devices for indicating the ground speed of the craft.

7. A navigational instrument adapted to be mounted upon a craft and comprising a gyroscope mounted in neutral equilibrium, a liquid level device for imparting gravity control to the gyroscope, and means for indicating the ground speed of the craft comprising a part associated with the gyroscope and a part associated with the device.

8. A navigational instrument adapted to be mounted upon a craft and comprising a gyroscope mounted in neutral equilibrium, a liquid level device for imparting gravity control to the gyroscope, and means whereby relative movement between the gyroscope and the device indicates the ground speed of the craft.

9. A navigational instrument adapted to be mounted upon a craft and comprising a gyroscope, and means associated with the gyroscope including members respectively rigid with and adjustable with respect to said gyroscope, certain of said members being relatively displaceable linearly and angularly to indicate the course and ground speed of the craft.

10. A navigational instrument adapted to be mounted upon a craft and comprising a gyroscope, means associated with the gyroscope for indicating the ground speed of the craft, and means for orienting the instrument.

11. A navigational instrument adapted to be mounted upon a craft and comprising a gyroscope, means associated with the gyroscope for indicating the ground speed of the craft, and a gyroscopic compass connected to the instrument for orienting it.

12. A navigational instrument adapted to be mounted upon a craft and comprising a gyroscope mounted in neutral equilibrium and provided with angularly separated force-applying means, a pair of liquid level devices yieldingly connected to said gyroscope in angular relation to each other to be responsive to the force-applying means for imparting gravity control to the gyroscope, and means for indicating the ground speed of the craft comprising a part associated with the gyroscope and a part associated with each of the devices.

13. A navigational instrument adapted to be mounted upon a craft and comprising a gyroscope, means associated with the gyroscope for indicating the ground speed of the craft, and means for compensating for the effect of the rotation of the earth upon the gyroscope.

14. A navigational instrument adapted to be mounted upon a craft and comprising a gyroscope mounted in neutral equilibrium, a pair of liquid level devices arranged at right angles to each other for imparting gravity control to the gyroscope, and means under the control of the devices for indicating the ground speed of the craft.

15. In a moving body, a gyroscope adapted to spin about an axis having a predetermined direction and rotatable about a second axis of predetermined direction when the body is stationary, and means, responsive to the said gyroscope, for determining the ground speed of the body in one of the said predetermined directions.

16. In a moving body, a gyroscope adapted to develop a torque as the direction of gravity changes with the movement of said body, and means, responsive to said torque, for determining the speed of said body.

JAMES BLACKLOCK HENDERSON.